(12) United States Patent
Russ et al.

(10) Patent No.: US 8,638,988 B2
(45) Date of Patent: Jan. 28, 2014

(54) MOVEMENT ANALYSIS AND/OR TRACKING SYSTEM

(71) Applicant: Movolution GmbH, Unterschleissheim (DE)

(72) Inventors: Andreas Russ, Unterschleissheim (DE); Philipp Russ, Unterschleissheim (DE); Sebastian Schubert, Unterschleissheim (DE); Tobias Winkler, Chemnitz (DE)

(73) Assignee: Movolution GmbH, Unterschleissheim (DE)

( * ) Notice: Subject to any disclaimer, the term of this patent is extended or adjusted under 35 U.S.C. 154(b) by 0 days.

(21) Appl. No.: 13/675,316

(22) Filed: Nov. 13, 2012

(65) Prior Publication Data
US 2013/0223679 A1 Aug. 29, 2013

Related U.S. Application Data

(63) Continuation of application No. PCT/EP2011/057654, filed on May 11, 2011.

(30) Foreign Application Priority Data

May 11, 2010 (DE) .......................... 10 2010 028 904

(51) Int. Cl.
*G06K 9/00* (2006.01)
(52) U.S. Cl.
USPC ....................................................... 382/103
(58) Field of Classification Search
None
See application file for complete search history.

(56) References Cited

U.S. PATENT DOCUMENTS

| 5,459,793 | A | 10/1995 | Naoi et al. |
| 8,103,055 | B2 * | 1/2012 | Stoddart et al. ............... 382/103 |
| 2007/0242086 | A1 | 10/2007 | Tsujimoto et al. |

(Continued)

FOREIGN PATENT DOCUMENTS

DE 691 10 142 T2 10/1995

OTHER PUBLICATIONS

Sampe, I.E., Vijai, A., Latifah, T., and Apriantono, T., A Study on the Effects of Lightning and Marker Color Variation to Marker Detection and Tracking Accuracy in Gait Analysis System, 2009, International Conference on Instrumentation, Communications, Information Technology, and Biomedical Engineering, pp. 1-5.*

(Continued)

*Primary Examiner* — Stephen R Koziol
*Assistant Examiner* — Jonathan S Lee
(74) *Attorney, Agent, or Firm* — Laurence A. Greenberg; Werner H. Stemer; Ralph E. Locher

(57) ABSTRACT

A novel system analyzes and/or tracks the motion of moved or moving objects that carry marker elements glowing in different, defined colors. Cameras record movements and continuously store digital color images. A transformer unit converts the color images into RGB color space. Three color intensities are present for each color pixel. A grayscale image production unit adopts the maximum of the three color intensities for each pixel as the grayscale value. A localization unit exclusively compares each grayscale value with a defined threshold value and stores grayscale values above the threshold value as a member of a pixel cloud that represents a potential marker element. A measuring unit measures the geometry of every pixel cloud exclusively in the grayscale image and deletes pixel clouds that can be excluded as marker elements. An identification unit determines the color of the confirmed pixel clouds in the digitally stored color image.

19 Claims, 1 Drawing Sheet

(56) References Cited

U.S. PATENT DOCUMENTS

2007/0279494 A1* 12/2007 Aman et al. .................. 348/169
2009/0174701 A1* 7/2009 Cotter et al. .................. 345/419
2010/0134600 A1* 6/2010 McKeon et al. ................ 348/48

OTHER PUBLICATIONS

Prasanna, V. and Gopinath, S., Converting Objects in Physical World into Digital World Using Color Recognition, Sep. 2012, Bonfring International Journal of Man Machine Interface, vol. 2, No. 3, pp. 7-13.*
Yonemoto, S. and Matsumoto, A., A Real-time Motion Capture System with Multiple Camera Fusion, International Conference on Image Analysis and Processing, pp. 600-605.*
Posada-Gomez, R., Sandoval-Gonzalez, O.O., Sanchez-Muniz, E., Development of a Motion Analysis System and Human-Machine Interaction through Digital Image Processing and Virtual Reality, 2011, 21st International Conference on Electrical Communications and Computers, pp. 284-288.*
Mehling, M., Implementation of a Low Cost Marker Based Infrared Optical Tracking System, 2006, Master's Thesis, Vienna University of Technology, pp. 1-90.*
Calife, D., et al., "Robot ARena: Infrastructure for Applications Involving Spatial Augmented Reality and Robots", IX Symposium on Virtual and Augmented Reality, pp. 92-99, URL: http://www.abs-tech.com/admin/modulos/portal/upload/arquivos/31/37.pdf.
Katsunari, S., et al., "Development of Grip-type Master Hand 'MeisterGRIP'", IEEE International Conference on Robotics and Automation, May 12-17, 2009, pp. 3283-3288, Kobe, Japan.
Masanori, H., et al., "Physical Motion Analysis System in Driving using Image Processing", Jan. 7-9, 2009, pp. 123-126, International Symposium on Intelligent Signal Processing and Communications Systems, Kanazawa, Japan.

* cited by examiner

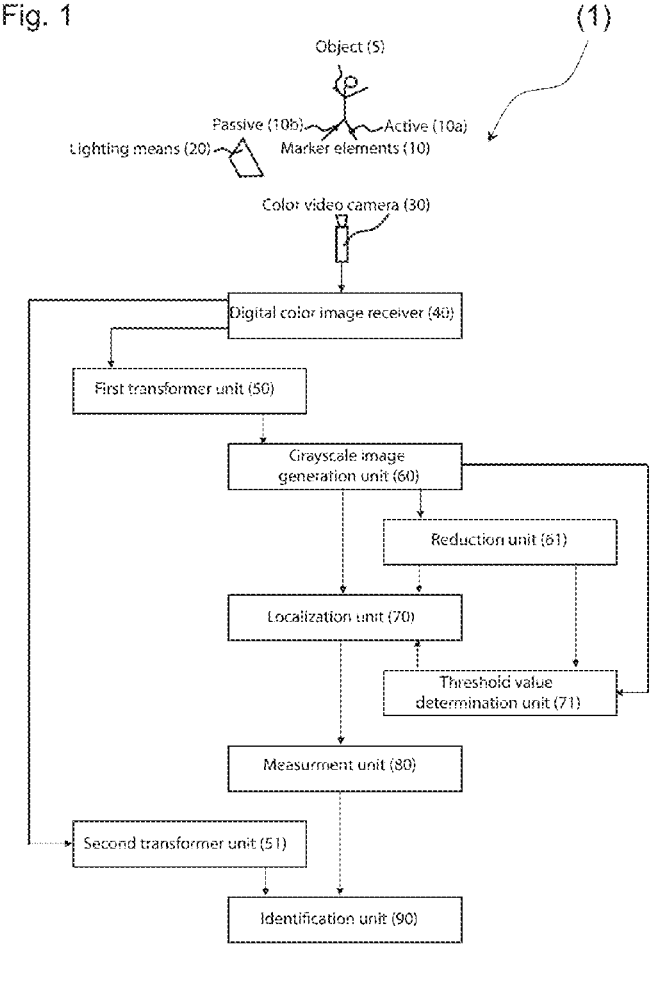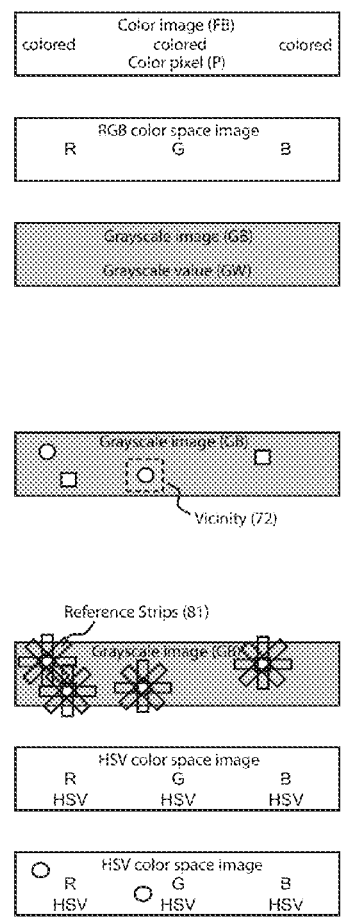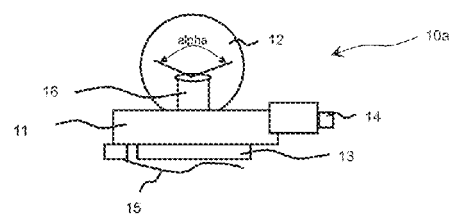

MOVEMENT ANALYSIS AND/OR TRACKING SYSTEM

CROSS-REFERENCE TO RELATED APPLICATION

This application is a continuation, under 35 U.S.C. §120, of copending international application No. PCT/EP2011/057654, filed May 11, 2011, which designated the United States; this application also claims the priority, under 35 U.S.C. §119, of German patent application No. DE 10 2010 028 904.3, filed May 11, 2010; the prior applications are herewith incorporated by reference in their entirety.

BACKGROUND OF THE INVENTION

Field of the Invention

The present invention relates to a system for movement analysis and/or for the tracking of moved or moving objects which are provided with a plurality of actively or passively emitting marker elements.

The demand for movement analysis and/or tracking systems is widespread and exists in a wide variety of fields, particularly in order to discover weaknesses in a movement action. Primarily, movement analyses are carried out on humans or animals in order to improve biomechanics in medicine or sports. A comparable aim is pursued with analysis of the movement actions of robotic arms and similar grippers. In this context, the basis of any movement analysis is the reliable acquisition in particular of angle and other measurement data as far as possible in real-time.

In many applications, the body (human, animal or robot, etc.) to be analyzed is provided with a plurality of marker elements. The data acquisition is carried out with the aid of cameras, which record the position changes of the marker elements applied on the movement apparatus and provide them to a data-processing system for evaluation. One difficulty in these applications consists in tracking the movement of each individual marker element in real-time and allocating a unique identity thereto in an automated fashion.

Previously, it has only been possible to carry out data in real-time in systems with upstream infrared filtering. Known infrared systems are distinguished by the use of special, and therefore normally very expensive, infrared cameras which attempt to localize contrast points, generated by passive or active infrared marker elements, in the image, which is achieved comparatively well in known infrared systems since all infrared image information except for the shining contrast points (markers) is filtered out. The localization of the infrared-active contrast points is normally carried out in a localization unit, which is integrated in the camera and then also forwards only the moving pixel coordinates of the infrared-active marker elements to an identification unit. Infrared-active marker elements are usually identified by means of a pulse frequency or light sequence. In this case, however, the problem arises that the electricity supply for a clock generator is very large and all the marker elements usually have to be cabled together. This gives rise to significant perturbing effects during the measurement, since the movements are impeded. Lastly, infrared systems have the disadvantage that they only provide position data of the marker elements. All image information is therefore lost even though this is important for many processes, particularly when, as in most applications, the users are not trained in the interpretation of data curves but would prefer—visually imparted—video data which permit visual analysis of the tracked movements directly in the color image.

The recognition in videos has previously been possible only by manual marking of fixed points or passive retroreflective marker elements in the image by means of a cursor and semiautomatic tracking with repeated corrector. Passive marker elements are in this case illuminated by lighting means in space or on the cameras, the reflective light of which generates a contrast point in the image. The acquisition of passive retroreflective marker elements works well to this extent, but automated identification among a plurality of identical marker elements is not possible. Known video systems are distinguished by image acquisition devices (video cameras) which attempt to localize the contrast points generated by the retroreflective marker elements. A disadvantage with this is that localizations by image processing are very complex, since the entire video image has to be analyzed (searched) for contrast points. There has not yet been any satisfactory solution in respect of reliability and time expenditure. For this reason, video systems have so far normally involved a multiplicity of manual operations. Thus, the visible contrast points (markers) are initially to be allocated manually in the first video image, i.e. the system is to be told, for example by a mouse click, that a particular contrast point (for example a marker element for the knee) is intended to be tracked here. Unique allocation of the contrast points makes it possible for the system to continue to track them during the movement action so long as the contrast point remains identifiable. Often, however, owing to concealment or lack of contrast sharpness, the contrast points can no longer be found or are falsely identified by the system, which necessitates manual reallocation.

SUMMARY OF THE INVENTION

It is accordingly an object of the invention to provide a motion analysis and/or tracking system, which overcomes the above-mentioned disadvantages of the heretofore-known devices and methods of this general type and which provides an improved such system which avoids the disadvantages associated with the prior art. In particular, the problems associated with the tracking of marker elements are intended to be overcome in an economical way by minimizing or eliminating the need for manual allocations of individual marker points. Furthermore, a system operating in real-time is intended to be provided. Lastly, a system according to the invention should also be able to automatically identify and re-recognize marker elements which have been lost.

With the foregoing and other objects in view there is provided, in accordance with the invention, a system for movement analysis and/or tracking of one or more moving objects, wherein the objects are provided with a plurality of marker elements actively or passively emitting different colors, and the marker elements respectively emitting in a defined color and with a round or elliptical geometry. The system comprises:

at least one camera for recording movements of the object and at least one color image receiver connected to said at least one camera for continuously storing digital color images;

a first transformer unit continuously converting the digital color images into RGB images in an RGB color space, so that three color intensities are available for each color pixel;

a grayscale image generation unit configured to adopt a maximum of the three color intensities as a grayscale value for each color pixel and continuously storing the grayscale value as a monochrome grayscale image in correspondence with the RGB images;

a localization unit configured to exclusively compare each grayscale value with a defined threshold value and to store grayscale values lying above the threshold value as members of a pixel cloud representing a potential marker element;

a measurement unit measuring a geometry of each pixel cloud exclusively in the grayscale image and deleting pixel clouds that can be excluded as marker elements; and an identification unit configured to determine a color in the digital color image of the pixel clouds confirmed as marker elements exclusively in the grayscale image.

In other words, the objects of the invention are achieved by a system for movement analysis and/or tracking of moved or moving objects which are provided with a plurality of marker elements actively or passively emitting different colors, respectively in a defined color and with a round or elliptical geometry, having the features as summarized above.

The system according to the invention is distinguished firstly by at least one camera for recording the movements of the object or objects, which are continuously stored as digital color images (FB) by means of at least one color image receiver. Depending on the application, besides highly complex film cameras which are based on photographic technology, commercially available video cameras whose image recording takes place continuously may in particular also be used as the cameras, the latter having the advantage of a low overall system cost because of their low cost.

Furthermore, the system according to the invention comprises a first transformer unit which continuously converts the digitally stored color images (FB) into RGB images of the so-called RGB color space, so that three color intensities (R, G, B) are available for each color pixel (P). As is known, an RGB color space is intended to mean an additive color space which—based on the three-color theory—replicates color replication by the additive mixing of three primary colors (red (R), green (G) and blue (B)).

By means of a grayscale image generation unit, which adopts the maximum of the three color intensities (R or G or B) as a grayscale value (GW) for each color pixel (P), a monochrome grayscale image (GB) is continuously stored in a manner corresponding to the RGB images. It is therefore advantageously possible to ensure that the marker elements appear as bright spots (contrast points) in the grayscale image (GB), which facilitates their localization.

The automatic localization of the members of a pixel cloud (PW) representing a potential marker element is carried out in a localization unit which exclusively compares each grayscale value (GW) with a defined threshold value (SW) and stores grayscale values (GW) lying above the threshold value (SW) as members of a pixel cloud (PW) representing a potential marker element.

The automatic plausibilization of localized pixel clouds, in respect of whether they represent a marker element, is carried out in a measurement unit which measures the geometry (in particular the shape and/or the size and/or the midpoint) of each pixel cloud (PW) exclusively in the grayscale image (GB) and deletes pixel clouds (PW) which can be excluded as marker elements.

Lastly, for the automatic identification of recognized i.e. localized and plausibilized marker elements, the movement analysis and/or tracking system according to the invention comprises an identification unit which determines the color in the digitally stored color image (FB) of the pixel clouds (PW) confirmed as marker elements exclusively in the grayscale image (GB).

Other than is to be found in the prior art, the system according to the invention for the first time makes it possible to fully automatically track a plurality of marker elements emitting different colors, respectively in a defined color and with a round or elliptical geometry, and record angles and other measurement data for movement analyses.

Advantageous embodiments of the invention, which may be implemented individually or in combination with one another, are specified in the appended claims.

Thus, a reduction unit may preferably be provided, which provides the localization unit with a reduced grayscale image ($GB_{red}$), preferably at least halved in width and height. This, as well as other conceivable size reductions by one third or even one quarter of the original image, advantageously increase the working speed of the system, which therefore for the first time robustly permits recording and analysis of video data in real-time.

Furthermore, a threshold value determination unit may preferably be provided, which dynamically determines the threshold value (SW) used by the localization unit as a function of the brightness distribution in the vicinity (U) of the grayscale value (GW) currently for comparison, which has the advantage of better determination of pixel clouds (PW).

In this context, it has proven expedient to dimension the vicinity (U) of the brightness distribution to be at least two times as large as a maximum size, selected as allowed, of a pixel cloud (PW) typically representing a potential marker element, which further improves the determination of the pixel clouds (PW).

For unique identification of the color of a marker element, lastly, a second transformer unit is provided, which provides the identification unit with HSV images, continuously transformed from the digitally stored color images (FB), of the so-called HSV color space in order to determine the color of a marker element. As is known, the HSV color space is the color space of a number of color models in which the color is defined with the aid of the hue, the color saturation (saturation) and the brightness value or darkness level (value).

As the marker elements emitting with a defined color and with a round or elliptical geometry, passive or active marker elements may be used.

As passive marker elements, in particular retroreflective prisms or spherical bodies which have a reflective component on their surface with a high directional effect, which reflects light of a special wavelength (color), and are known for example from DE 691 10 142 T2, these being illuminated by at least one lighting means, have proven expedient.

According to the invention, however, marker elements formed to be actively self-illuminating are preferably used, which advantageously avoid the outlay associated with lighting means, and also require no cabling to an electrical source when they are particularly preferably formed as battery-powered LED lamps.

The LED lamp may be fastened directly on a battery holder and/or have a special wavelength (color), emission angle and/or lamp intensity.

In particular, LED lamps in the colors red, green and/or blue have proven expedient, which have a preferred emission angle alpha ($\alpha$) of at least 130° and up to 170°, as well as a preferably superwide lamp intensity.

For homogenization of the round geometry of a marker element formed as an LED lamp, it has lastly proven expedient for the one or more LEDs of an LED lamp to be surrounded by a spherical plastic screen, which always has a round or elliptical geometry in the camera image.

The system according to the invention can for the first time localize in quasi-real-time, and track as a function of time, video data of the preferably spherically shaped marker elements.

Although the invention is illustrated and described herein as embodied in a movement analysis and/or tracking system, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

BRIEF DESCRIPTION OF THE SEVERAL VIEWS OF THE DRAWING

FIG. 1 shows schematically a movement analysis and/or tracking system according to the invention;

FIG. 2 shows schematically image examples of the respective system stages; and

FIG. 3 shows schematically a marker element formed to be actively self-illuminating.

DETAILED DESCRIPTION OF THE INVENTION

In the following description of a preferred embodiment of the present invention, identical references denote components which are the same or comparable.

Referring now to the figures of the drawing in detail and first, particularly, to FIG. 1 thereof, there is seen a system 1 for movement analysis and/or tracking of moved or moving objects 5 according to the invention. The moved or moving objects 5 may be humans, animals or devices such as, in particular, robotic arms. They are provided with a plurality of marker elements 10 either actively 10a or passively 10b emitting different colors, which 10 respectively emit in a defined color and with a round or (or in reality) elliptical geometry. The marker elements 10 emitting different colors, which are arranged on the objects 5, follow the movements of the objects 5, which are recorded by at least one camera 30 and continuously stored as digital color images (FB) by means of at least one color image receiver 40.

The preferred color image receivers 40 are CCD (charge-coupled device) chips or CMOS (complementary metal oxide semiconductor) sensors. A CMOS chip records the image continuously, and thus can be read out at any time. The number of images per second depends on how high the pixel frequency and the number of pixels of the image section read out are, but are higher than in the case of a CCD chip. CCDs, on the other hand, represent an important step for reducing the size of video cameras. The image sensors can also be cooled, which allows substantially lower-noise images.

In order to obtain the color information in the video image (FB) usefully, at least three color components (red, green, blue) must be stored. The most obvious way of achieving the color separation is to use three image receivers 40 for each color ("triple chips") and couple them via optics which also undertake the color separation using filters. The method was customary in the vidicon era. Modern 3-chip cameras usually distribute the light passing through the lens via prisms or splitter mirrors onto three monochrome CCD chips. The effect achieved by using color filters is that one chip records the green components, and the other two respectively record red and blue. This method leads to very high-quality images and is therefore used in the professional field.

Particularly in low-cost cameras ("one-chip"), a different method is used. The image receiver chip alternately carries color filters of the respective color in front of each pixel, so that adjacent pixels record different color components. Electronics generate a color video signal therefrom. The required higher number of pixels (2×green, 1×red, 1×blue per pixel) usually leads to inferior resolution: in any event, however, the color rendition is not as accurate as with 3-chip cameras. One image receiver which uses this method is the Bayer sensor. In this case, in front of the photosensitive cells of a CCD sensor, a minute color filter in one of the three RGB primary colors red (R), green (G) or blue (B) is applied in front of each individual cell. The filters are normally applied in the arrangement R-G-R-G and in the next row G-B-G-B, which in this arrangement give the so-called "Bayer pattern".

On the basis of this, the system according to the invention comprises a first transformer unit 50 which continuously converts the digitally stored color images (FB) into RGB images of the so-called RGB color space, so that three color intensities (R, G, B) are available for each color pixel (P).

By means of a grayscale image generation unit 60, which adopts the maximum of the three color intensities (R or G or B) as a grayscale value (GW) for each color pixel (P), a monochrome grayscale image (GB) is continuously stored in a manner corresponding to the RGB images.

By means of a reduction unit 61 which is only preferably provided, a significantly reduced grayscale image ($GB_{red}$) can be provided, which greatly increases the working speed of the system 1, particularly for real-time or so-called life-stream applications, since it is no longer necessary to search through the entire image area.

Likewise, a localization unit 70 which exclusively compares each grayscale value (GW) in a reduced grayscale image ($GB_{red}$) with a defined threshold value (SW) and stores grayscale values (GW) lying above the threshold value (SW) as members of a pixel cloud (PW) representing a potential marker element, requires significantly less working time.

The same applies for a threshold value determination unit 71, likewise merely preferably provided, which dynamically determines the threshold value (SW) used by the localization unit 70 as a function of the brightness distribution in the vicinity (U) of the grayscale value (GW) currently for comparison.

By means of a measurement unit 80, which measures the geometry (in particular the shape and/or the size and/or the midpoint) of each pixel cloud (PW) exclusively in the grayscale image (GB) which is preferably not reduced, pixel clouds (PW) which can be excluded as marker elements 10 are deleted.

FIG. 2 shows image examples of the respective system stages.

FIG. 3 shows a side view of an actively emitting marker element 10 preferably employed according to the invention. The marker element 10 consists of a battery-powered LED lamp 10a, which comprises an LED 16 of defined wavelength in the colors red, green or blue. As an alternative, it is also possible to use LED lamps (not shown) that for example comprise three LEDs 16 respectively emitting in one of the primary colors red (R), green (G) and blue (B), which may for example be formed so that they can be switched on and/or driven individually or together and thus emit the respective primary color red (R), green (G) or blue (B) or a derivable mixed color, which advantageously increases the usable color variances. The one or more LEDs 16 of an LED lamp 10a preferably has or have an emission angle α of at least 130° and up to 170°, as well as preferably a superwide lamp intensity.

The one or more LEDs 16 of an LED lamp 10a may be fastened on a battery holder 11 and surrounded by a spherical screen 12 of, preferably translucent (i.e. it transmits light but is not transparent), plastic. Such a spherical screen 12 permanently leads to a contrast surface appearing round or elliptical in the color image (FB).

As the battery 13, so-called button cells, which are held in the battery holder 11 by means of a clip 15, have proven expedient in particular. These are distinguished in particular by a compact size and simple electricity supply. A switch 14 on the battery holder 11 makes it possible to switch the one or more LEDs 16 of an LED lamp 10a on and off. As an alternative to a separate switching element 14, provision may also be made to carry out the switch-on and switch-off function by rotating the spherical screen 12, in which case particular angular settings of the spherical screen 12 may be allocated to particular LEDs (red (R), green (G) and/or blue (B)) when there are a plurality of LEDs 16.

Depending on the choice of the wavelength, a first actively emitting LED lamp 10a shines red (R), another blue (B) and a third green (G), and so on, or optionally in a mixed color. The LED lamps 10a therefore contain a unique feature for their automatic identification.

This is carried out according to the invention in an identification unit 90, which determines the color in the digitally stored color image (FB) of the pixel clouds (PW) confirmed as marker elements 10a, in particular by a comparison of the image positions, localized exclusively in the grayscale image (GB), in the color image (FB).

For unique identification of the color of a marker element 10a, a second transformer unit 51 may preferably be provided, which provides the identification unit 90 with HSV images, continuously transformed from the digitally stored color images (FB), of the so-called HSV color space in order to determine the color of a marker element 10a.

If more marker elements 10a are required than one marker element 10a shining red (R), blue (B) or green (G), the identification may be ensured by means of defined arrangements of further marker elements 10a shining red (R), blue (B) or green (G), and/or the use of further marker elements 10a having differently colored LEDs such as yellow (Y) or violet (V) etc. and/or a plurality of differently colored LEDs.

For accurate measurement, in particular of the midpoint, of a marker element 10, instead of a curve search the measurement unit 80 preferably uses a so-called ellipse fitting approach which is applied to sample points of the pixel cloud (PW) of a potential marker contour. In order to determine these sample points, an estimation of the midpoint of the pixel cloud (PW) of the potential marker element 10 is firstly assumed.

From an estimated midpoint, a search can then be made in e.g. eight discrete directions for the grayscale pixels with the maximum contrast (here taken as maximum brightness change). In this case, it may be assumed that the pixel cloud (PW) as a representation of a marker element 10a always has a uniform high contrast. In other words, a search is made for the edge points of a dark/bright/dark transition by taking a corresponding reference strip 81 from the overall image in the respective direction, starting from the estimated position of the midpoint. The pixels of the strip 81 may in this case respectively be determined in a weighted fashion from a plurality of pixels (P) of the grayscale value (GW) image (GB).

The width of the strip 81 determines the available vicinity U for the contrast determination. The contrast may be determined in the form of the first derivative, in particular by applying a simple edge detection filter to the image strips 81. Each direction in which the pixel cloud (PW) of the potential marker element 10a is sampled in this case gives a strip 81 and therefore discrete sampling of the derivative in this direction. The two contour points in a particular direction must lie precisely at the minimum or maximum of the derivative, the shape of the derivative curve additionally being used in order to estimate the quality of the pixel cloud (PW) as a representation of the marker element 10a and therefore the quality of the contour point positions determined.

For each direction step, two contour points and one evaluation are therefore obtained. In order to compensate for high-contrast perturbations from the marker vicinity and poor estimates of the midpoint, for each direction step the midpoint is determined (as a point between its two contour points) and those direction steps whose midpoints deviate too greatly from the average are excluded. The new estimate, thereby more robustly determined, of the midpoint of a point cloud (PW) as a representation of a marker element 10a may be used in turn to determine the minimum and maximum in the immediate vicinity of the midpoint estimate in the derivative curves of the excluded direction steps, so that the aforementioned perturbations are avoided in the majority of cases.

The final midpoint and radius of the point cloud (PW) as a representation of a potential marker element 10a can now be determined by the ellipse fitting mentioned in the introduction, by using the previously determined contour points. For cases in which the estimate of the marker midpoint lies too far away from the actual marker, the measurement approach explained above may be carried out iteratively until the results convert sufficiently, or a maximum iteration number is reached. Point clouds (PW) of potential marker elements 10a can thereby be localized reliably even in situations in which a poor first estimate delivered usable results only in a few direction steps and therefore only a better estimate of the midpoint.

In order to localize in particular new or lost marker elements 10, a binary mask, in which the "sufficiently bright" pixels can be marked, may be determined in the localization unit 70 from the grayscale image (GB) as an input image by means of the threshold value treatment. In this case, "sufficiently bright" is preferably defined not by an absolute threshold value (SW) but in a threshold value determination unit 71 respectively by the average brightness of the vicinity. From this binary mask, the connectivity components are then determined which therefore represent all regions deemed sufficiently bright or high-contrast of the preferably reduced grayscale image (GB). With simple filtering on the basis of the centroid (SW), maximum diameter and covariance of the respective regions, those which are too large, too small or too irregularly shaped are excluded. The remaining regions are then used as estimates of potential marker elements 10, which are then subsequently refined in the measurement unit 80—as described above.

This coarse determination (localization) of potential marker contours must always be carried out for each full frame of the grayscale images (GB), even when the markers can be tracked incrementally by means of the measurement approach, since otherwise new markers could not be recognized. So that the moved old markers, which have already been relocalized by the measurement approach (by extrapolation of marker midpoints obtained from previous measurements) do not unnecessarily have to be processed again by the localization approach, the image regions in which marker elements 10 have already been localized successfully by the measurement approach are excluded from the binary mask.

As a further acceleration measure, which also partly increases the robustness of the system 1, the grayscale image data are reduced by a particular factor (preferably by at least 2) before determining the binary mask. In this case, however, a natural limit can arise from the minimum desired marker size (in the sense of the representation of the markers).

Other than is to be found in the prior art, the system according to the invention for the first time makes it possible to fully automatically track at least two or more marker elements 10 emitting different colors, respectively in a defined color and with a round or elliptical geometry, and record angles and other measurement data for movement analyses.

The system 1 described above for a camera 30 may readily also be used for a system which comprises a plurality of time-synchronized cameras 30, in particular from four to eight, preferably six, so that a plurality of parallel synchronized video streams are therefore available. In order to reconstruct the spatial (3D) positions of the marker elements 10, calibration data of the cameras used (and naturally at least two image sources) are necessary, which has the advantage of more accurate marker tracking or movement analysis.

The output consists of the 3D positions of the recognized marker elements 10 in each image (frame). Each marker element 10 is allocated a unique numerical identifier (ID) when it is discovered for the first time. If marker elements are no longer found in subsequent images (frames) (for instance because they are concealed in too many camera images and in too many successive frames), then they are allocated a new ID when they are rediscovered. The 3D positions preferably relate to the same coordinate system as that in which the extrinsic camera calibrations (transformations) are defined. The intrinsic calibration data (focal length, lens distortion) of the camera 30 is also readily available for each individual video stream.

Lastly, the problem normally to be encountered in known 3D systems, in respect of which marker elements in one camera correspond to the marker elements in the other cameras, is advantageously resolved in the system 1 according to the invention by using marker elements 10 which can be differentiated by color, which permit unique identification.

The tracking system 1 according to the invention for the first time makes it possible to localize in quasi-real-time, and track as a function of time, video data of the preferably spherically shaped marker elements 10, which permits movement analyses in hitherto unknown comfort and quality.

In conclusion, the present invention may be summarized, in short, as relating to a system 1 for analyzing and/or tracking the movement of moved or moving objects 5 which are provided with a plurality of marker elements 10 which actively or passively glow in different colors and each of which 10 glow in a defined color and with a round or elliptical geometry, at least comprising: at least one camera 30 for recording the movements of the objects 5 which are continuously stored as digital color images FB using at least one color image sensor 40; a first transformer unit 50 which continuously converts the digitally stored color images FB into RGB images of the so-called RGB color space, with the result that three color intensities R, G, B are present for each color pixel P; a grayscale image production unit 60 which, for each color pixel P, adopts the maximum of the three color intensities R or G or B as the grayscale value GW and continuously stores it as a monochromatic grayscale image GB in a manner corresponding to the RGB images; —a localization unit 70 which exclusively compares each grayscale value GW with a defined threshold value SW and stores grayscale values GW which are above the threshold value SW as a member of a pixel cloud PW which represents a potential marker element; a measuring unit 80 which measures the geometry of every pixel cloud PW exclusively in the grayscale image GB and deletes pixel clouds PW again which can be excluded as marker elements 10; and an identification unit 90 which determines the color of the pixel clouds PW, which have been confirmed as marker elements 10 exclusively in the grayscale image GB, in the digitally stored color image FB. Unlike in the prior art, the system 1 according to the invention makes it possible, for the first time, for a plurality of marker elements 10 which glow in different colors, each in a defined color and with a round or elliptical geometry, to be tracked in a fully automatic manner and for angles and other measurement data to be acquired for movement analyses. The system 1 according to the invention can locate video data relating to the marker elements 10, which are preferably spherical, in a manner close to real time for the first time and can track said data over time.

The following is a list of reference numerals and symbols used in the description of the invention:
1 movement analysis and/or tracking system
5 moved or moving object
10 marker elements
10$a$ active marker elements, in particular light-emitting LED lamps
10$b$ passive marker elements, in particular light-reflecting prismatic or spherical bodies
11 battery holder
12 spherical screen
13 battery
14 switch
15 battery clip
16 LED
20 lighting means
30 camera, in particular video camera
40 color image receiver
50 first transformer unit
51 second transformer unit
60 grayscale image generation unit
61 reduction unit
70 localization unit
71 threshold value determination unit
72 vicinity
80 measurement unit
81 reference strips
90 identification unit
FB color image
P color pixel
U vicinity of a color pixel P
RGB RGB image; RGB color space
GW grayscale value
GB grayscale image
$GB_{red}$ reduced grayscale image
SW threshold value
PW pixel cloud
HSV HSV image; HSV color space
$\alpha$ emission angle of the LED 16

The invention claimed is:

1. A system for movement analysis or tracking of a moving object, wherein the object is provided with a plurality of marker elements actively or passively emitting different colors, and the marker elements respectively emitting in a defined color and with a round or elliptical geometry, the system comprising:
at least one camera for recording movements of the object and at least one color image receiver connected to said at least one camera for continuously storing digital color images;

a first transformer unit continuously converting the digital color images into RGB images in an RGB color space, so that three color intensities are available for each color pixel;

a grayscale image generation unit configured to adopt a maximum of the three color intensities as a grayscale value for each color pixel and continuously storing the grayscale value as a monochrome grayscale image in correspondence with the RGB images;

a localization unit configured to exclusively compare each grayscale value with a defined threshold value and to store grayscale values lying above the threshold value as members of a pixel cloud representing a potential marker element;

a measurement unit measuring a geometry of each pixel cloud exclusively in the grayscale image and deleting pixel clouds that can be excluded as marker elements; and an identification unit configured to determine a color in the digital color image of the pixel clouds confirmed as marker elements exclusively in the grayscale image.

2. The system according to claim 1, further comprising a reduction unit for providing the localization unit with a reduced grayscale image.

3. The system according to claim 2, wherein the reduced grayscale image is an image at least halved in width and height.

4. The system according to claim 1, further comprising a threshold value determination unit for dynamically determining the threshold value used by said localization unit as a function of a brightness distribution in a vicinity of the grayscale value currently for comparison.

5. The system according to claim 4, wherein the vicinity of the brightness distribution is dimensioned to be at least two times as large as a maximum size, selected as allowed, of a pixel cloud representing a potential marker element.

6. The system according to claim 1, further comprising a second transformer unit configured to provide said identification unit with HSV images, continuously transformed from the digital color images, of an HSV color space in order to determine a color of a marker element.

7. The system according to claim 1, wherein the marker element is a retroreflective prism illuminated by at least one light source.

8. The system according to claim 1, wherein the marker element is an actively self-illuminating marker element.

9. The system according to claim 8, wherein said actively self-illuminating marker element is a battery-powered LED lamp.

10. The system according to claim 9, wherein said LED lamp is fastened directly on a battery holder.

11. The system according to claim 9, wherein each said LED lamp comprises an LED respectively emitting in a defined hue.

12. The system according to claim 11, wherein each said LED lamp comprises three LEDs respectively emitting in one of the primary colors red, green, and blue.

13. The system according to claim 9, wherein said LED lamp comprises three LEDs to switched on and/or driven individually or together and thus emitting the respective primary color red, green and blue or a mixed color derived therefrom.

14. The system according to claim 13, wherein each LED has an emission angle alpha of at least 130° and up to 170°.

15. The system according to claim 13, which comprises a spherical screen surrounding said LED lamp.

16. The system according to claim 9, which comprises a spherical screen surrounding one or more LEDs of said LED lamp.

17. The system according to claim 1, wherein said at least one camera is one of a plurality of cameras.

18. The system according to claim 17, wherein said at least one camera is one of four to eight cameras.

19. The system according to claim 18, wherein said at least one camera is one of six cameras.

* * * * *